No. 618,727. Patented Jan. 31, 1899.
E. D. PRIEST.
ARMATURE FOR DYNAMO ELECTRIC MACHINES.
(Application filed Aug. 26, 1898.)
(No Model.)
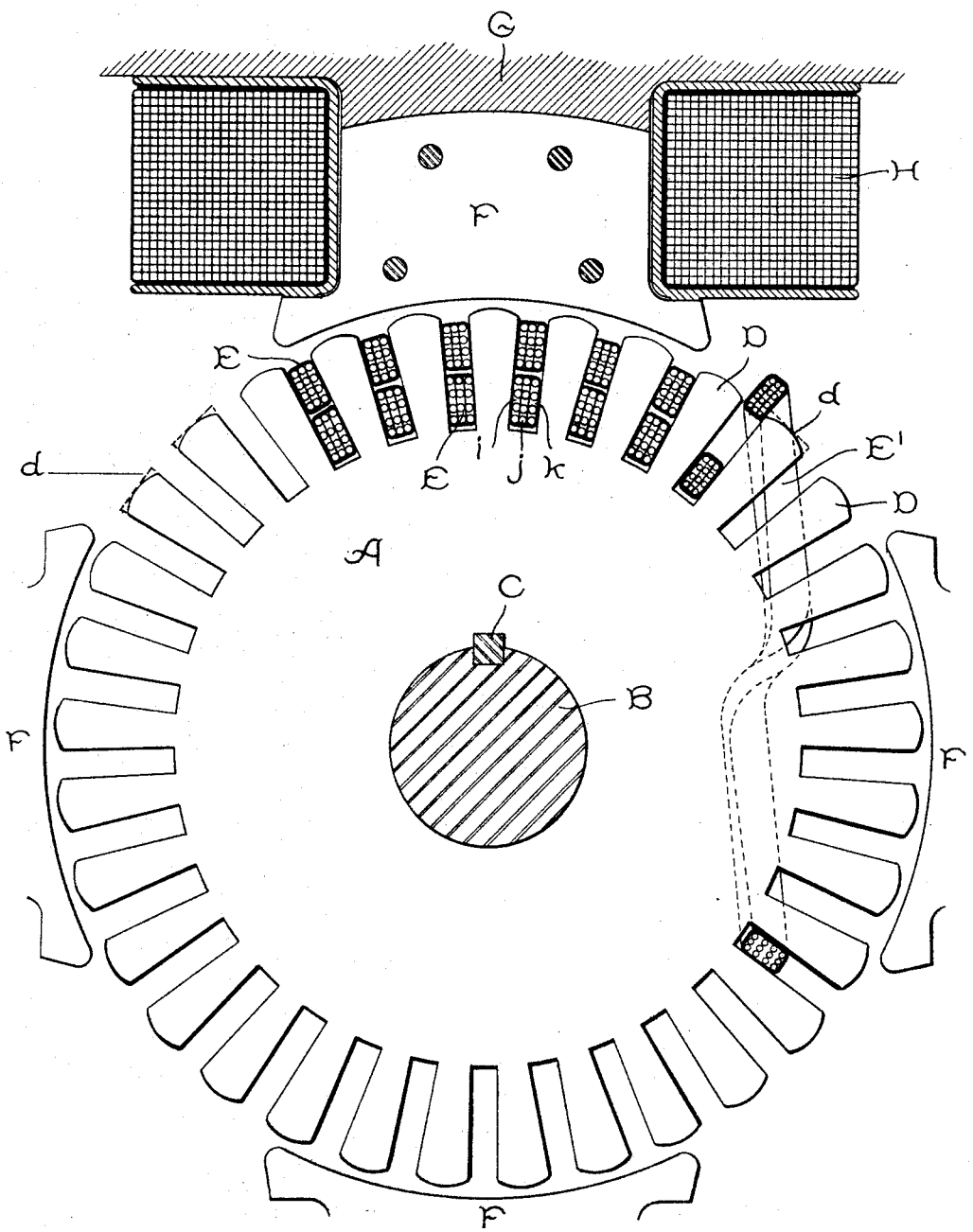

UNITED STATES PATENT OFFICE.

EDWARD D. PRIEST, OF SCHENECTADY, NEW YORK, ASSIGNOR TO THE GENERAL ELECTRIC COMPANY, OF NEW YORK.

ARMATURE FOR DYNAMO-ELECTRIC MACHINES.

SPECIFICATION forming part of Letters Patent No. 618,727, dated January 31, 1899.

Application filed August 26, 1898. Serial No. 689,556. (No model.)

*To all whom it may concern:*

Be it known that I, EDWARD D. PRIEST, a citizen of the United States, residing at Schenectady, in the county of Schenectady, State of New York, have invented certain new and useful Improvements in Armatures for Dynamo-Electric Machines, (Case No. 848,) of which the following is a specification.

Most forms of armature are now made with slots for the reception of the coils, and it is to the construction of armatures of this class that my invention relates. Modern practice in the construction of armatures, and particularly of those designed for railway-motors, tends toward uniting several small coils into a single coil by wrapping the coils with tape or other insulation. It is customary to bind two or three of the small coils together and apply them as a single unit to the core. This is a desirable construction, for it tends to increase the output of the machine and it also reduces the number of individual coils to be handled; but in some respects it renders the winding of the armature more difficult, as the coils are much more rigid, and consequently cannot be bent over the teeth and other coils as readily.

My invention has for one of its objects to provide a toothed armature in which the teeth are so arranged that the coils may be readily slipped into place without being seriously distorted.

A further object of my invention is to improve the construction of the armature so that sparking at the commutator is reduced to a minimum.

In the accompanying drawing, which shows an embodiment of my invention, A represents a toothed armature-core made up of thin laminæ or punchings and prevented from moving independently of the shaft B by a key C. The core is provided with a plurality of teeth D, and between these teeth are formed slots for the reception of the armature-coils E. Surrounding the armature-core are four field-magnet poles F, which may be of any desired construction, those shown consisting of laminated tips secured to the cast-metal frame G. The upper pole-piece is shown as having an exciting or field coil H, while the coils are omitted from the other poles; but it is to be understood that they may be and preferably are also provided with coils. By reason of the comparatively few coils on the armature the teeth D are of substantial size, and this is a desirable feature for mechanical and magnetic reasons.

The coils E, with which the armature is wound, are composed of three small coils $i\,j\,k$, insulated from each other, but secured together by an external wrapping of tape or other insulation. An armature wound with coils of this construction is commonly spoken of as one having three coils to a slot. This is a desirable construction, for it reduces the necessary amount of insulation, it not being necessary to place as much insulation between the coils as between the coils and the core. Each tooth is provided with a curved or beveled end, as shown at $d$. I have shown the ends of the teeth curved in the arc of a circle, as excellent results have been obtained with this construction; but the shape may be varied, if desired, so long as the sides of the teeth are not as high as the center.

By referring to the coil $E'$ (shown in section) the advantage of the beveled or curved end teeth from a mechanical standpoint is apparent. As is customary with a winding of the Eickemeyer type, one side of each coil is placed in the bottom of the slot and the other side is placed on top of the bottom side of a similar coil located in an adjacent slot. With a tooth having a square or approximately square end the insertion of the top side of the coil is attended with considerable difficulty, as the lower inside corner of the coil strikes the corner of the tooth and the coil has to be distorted before it can be inserted; but where the tooth is curved on the end this difficulty is decreased by an amount depending upon the extent of the curve or drop between the center of the tooth and the edge.

In addition to the mechanical advantages to be derived from an armature of this construction I find that it possesses certain electrical advantages, for the reason that the teeth will enter and leave the magnetic field under the pole-pieces in a more smooth and gradual manner, which reduces the sparking at the commutator. By experimenting I have found that with an armature having the ends of the teeth curved or beveled, substantially as shown in the drawings, the sparking at the commutator for a given load will be less than with a similarly-wound armature having teeth which are square or substantially square at their ends.

What I claim as new, and desire to secure by Letters Patent of the United States, is—

1. An armature for a dynamo-electric machine, comprising a toothed body of metal, having coil-slots between the teeth, the teeth being so arranged that they decrease in height toward the slot adjacent thereto, and coils mounted in the slots.

2. An armature for a dynamo-electric machine, comprising a toothed body of iron having straight-sided slots and designed to receive a number of coils, the teeth being so arranged that they are highest in the center and decrease in height toward their outer edges.

3. An armature for a dynamo-electric machine, comprising a toothed body of laminated iron having straight-sided coil-slots formed between adjacent teeth, the said teeth being highest in the center, and gradually decreasing in height toward the sides of the slot, and coils mounted in said slots.

4. In a dynamo-electric machine, the combination of a field-magnet, a toothed armature, the armature and field-magnet being arranged to move with respect to each other, the teeth on the armature being so shaped that they enter the field-flux under the field-magnet in a smooth and gradual manner, and coils mounted between the teeth of the armature.

5. In a dynamo-electric machine, the combination of magnetic pole-pieces therefor, and a toothed armature built up of laminated iron, the ends of the teeth of the armature being curved from the center toward the sides for the purpose described, and coils mounted between the armature-teeth.

6. As an article of manufacture, a punching for an armature, consisting of a body of metal having teeth formed in its outer periphery, the ends of the teeth being highest in the center, and gradually decreasing in height toward the sides, and straight-sided slots formed between the teeth.

In witness whereof I have hereunto set my hand this 23d day of August, 1898.

EDWARD D. PRIEST.

Witnesses:
 A. F. MACDONALD,
 A. H. ABELL.